(12) United States Patent
Ozaki et al.

(10) Patent No.: US 12,331,828 B2
(45) Date of Patent: Jun. 17, 2025

(54) DRIVING FORCE TRANSMISSION DEVICE

(71) Applicant: KAMOSEIKO KABUSHIKI KAISHA, Toyota (JP)

(72) Inventors: Masashi Ozaki, Toyota-sh (JP); Yusuke Fukuoka, Seto (JP)

(73) Assignee: KAMOSEIKO KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/293,320

(22) PCT Filed: Feb. 11, 2022

(86) PCT No.: PCT/JP2022/005525
§ 371 (c)(1),
(2) Date: Jan. 29, 2024

(87) PCT Pub. No.: WO2023/032258
PCT Pub. Date: Mar. 9, 2023

(65) Prior Publication Data
US 2024/0247712 A1    Jul. 25, 2024

(30) Foreign Application Priority Data
Sep. 2, 2021 (JP) .................................. 2021-143346

(51) Int. Cl.
| | |
|---|---|
| *F16H 57/04* | (2010.01) |
| *F16H 1/06* | (2006.01) |
| *F16H 1/24* | (2006.01) |
| *F16H 19/04* | (2006.01) |

(52) U.S. Cl.
CPC ..... *F16H 57/0434* (2013.01); *F16H 57/0467* (2013.01); *F16H 57/048* (2013.01); *F16H 1/06* (2013.01); *F16H 1/24* (2013.01); *F16H 19/04* (2013.01)

(58) Field of Classification Search
CPC ........ F16H 1/24; F16H 55/10; F16H 57/0434; F16H 57/0467; F16H 57/048; F16H 57/0421
See application file for complete search history.

(56) References Cited

U.S. PATENT DOCUMENTS 8,893,568 B2 * 11/2014 Katayama ........... F16H 57/0406
74/415
2013/0008267 A1    1/2013 Katayama

FOREIGN PATENT DOCUMENTS

| JP | 2013-19435 A | 1/2013 |
|---|---|---|
| JP | 2020-101271 A | 7/2020 |

* cited by examiner

*Primary Examiner* — Gregory Robert Weber
(74) *Attorney, Agent, or Firm* — Yoshida & Associates LLC; Kenichiro Yoshida

(57) ABSTRACT

A transmission device (1) includes an oil feeder (7) including coil springs (9a, 9b) urging a feeder body (8) in a third direction. The third direction is perpendicular to a first direction and to a second direction, where the first direction is the axial direction of rotation of a pinion (2), and the second direction is a direction of a specific tangent of tangents to a circle being a path of the outermost peripheries of revolving pin rollers (4). The transmission device (1) has less performance decrease in feeding oil to the pin rollers (4) resulting from wear of the feeder body (8).

6 Claims, 12 Drawing Sheets

DRIVING FORCE TRANSMISSION DEVICE

FIELD

The present disclosure relates to a driving force transmission device.

BACKGROUND

A known rack-and-pinion driving force transmission device 100 may include, as shown in the example in FIG. 20, a pin-roller pinion 101 to reduce, for example, backlash (refer to, for example, Patent Literature 1). The pin-roller pinion 101 includes, for example, multiple pin rollers 102 (described below) and two supports 103 supporting the pin rollers 102.

More specifically, the pin rollers 102 are, for example, metal cylinders. The two supports 103 support the pin rollers 102 at the two ends of the pin rollers 102 in the axial direction to arrange the pin rollers 102 in a cylindrical shape and parallel to the axial direction of rotation of the pinion 101. The driving force transmission device 100 rotates, for example, the pinion 101 with the pin rollers 102 serving as teeth meshing with another gear.

The driving force transmission device 100 including the pin-roller pinion 101 feeds oil to the tooth surfaces for smooth meshing between the pin rollers 102 and another gear. To avoid direct manual oil application to the teeth, an oil feeder 104 is attached to the pinion 101 to feed oil to the pin rollers 102.

More specifically, the oil feeder 104 includes a feeder body 105 and an urging unit 106 described below. The feeder body 105 is a source of oil fed to the pin rollers 102, and is formed from, for example, an oil-impregnated resin. The feeder body 105 includes a cylindrical surface 107 with a radius substantially the same as the radius of the revolution of the outermost peripheries of the pin rollers 102 when the pinion 101 rotates. The urging unit 106 urges the feeder body 105 to place the cylindrical surface 107 in contact with the outermost peripheries of the pin rollers 102.

The oil feeder 104 feeds oil to the pin rollers 102 from the feeder body 105 when the pinion 101 rotates and the outermost peripheries of the pin rollers 102 slide on the cylindrical surface 107. The driving force transmission device 100 feeds oil to the pin rollers 102 in this manner for smooth meshing.

In the driving force transmission device 100, the feeder body 105 is arc-shaped. The urging unit 106 includes coil springs 106a and 106b urging the feeder body 105 at multiple positions on the arc in directions perpendicular to the tangents to the arc at the respective positions and perpendicular to the rotation axis of the pinion 101, or in other words, urging the feeder body 105 in radial directions at the respective positions to press the cylindrical surface 107 against the pin rollers 102.

In the driving force transmission device 100, the feeder body 105 is retained with its two ends hooked on hooks 108. The feeder body 105 has the oil feed performance for the pinion 101 determined based on the pressing force against the pin rollers 102. The pressing force against the pin rollers 102 is substantially equal to the sum of the urging force of the urging unit 106 and the elastic force resulting from elastic deformation of the feeder body 105.

In this structure, once the cylindrical surface 107 is worn down, the modulus of elasticity of the feeder body 105 changes largely. The pressing force thus also changes largely, thus greatly lowering the oil feed performance for the pinion 101.

CITATION LIST

Patent Literature

Patent Literature 1: Japanese Unexamined Patent Application Publication No. 2013-19435

BRIEF SUMMARY

Technical Problem

One or more aspects of the present disclosure are directed to a driving force transmission device including a pin-roller pinion to feed oil to pin rollers from a feeder body for smooth meshing between the pin rollers and another gear, with less performance decrease in feeding oil to the pin rollers resulting from wear of the feeder body.

Solution to Problem

A driving force transmission device according to a first aspect of the present disclosure includes a pinion that meshes with a gear and an oil feeder that feeds oil to the pinion. The pinion includes a plurality of pin rollers arranged in a cylindrical shape and parallel to an axial direction of rotation of the pinion. Each of the plurality of pin rollers is cylindrical and meshes with the gear as a tooth.

The oil feeder includes a feeder body and an urging unit described below. The feeder body is a source of oil fed to the plurality of pin rollers, and includes a cylindrical surface with a radius substantially same as a radius of revolution of outermost peripheries of the plurality of pin rollers when the pinion rotates. The urging unit urges the feeder body to place the cylindrical surface in contact with the outermost peripheries of the plurality of pin rollers. The oil feeder feeds oil to the plurality of pin rollers from the feeder body when the pinion rotates and the outermost peripheries of the plurality of pin rollers slide on the cylindrical surface.

The urging unit further urges the feeder body in a third direction perpendicular to a first direction and to a second direction at two or more positions, where the first direction is the axial direction of rotation of the pinion, and the second direction is a direction of a specific tangent of tangents to a circle being a path of the outermost peripheries of the plurality of pin rollers revolving. In a driving force transmission device according to a second aspect of the present disclosure, the feeder body places the cylindrical surface in contact with the outermost peripheries of the pin rollers with its elasticity. The driving force transmission device according to this aspect of the present disclosure includes the pin-roller pinion and feeds oil to the pin rollers from the feeder body for smooth meshing between the pin rollers and another gear, and potentially avoid decreasing the oil feed performance for the pin rollers resulting from wear of the feeder body.

DETAILED DESCRIPTION

Embodiments of the present disclosure will now be described in detail.

EMBODIMENTS

Structure in First Embodiment

Figure 1:
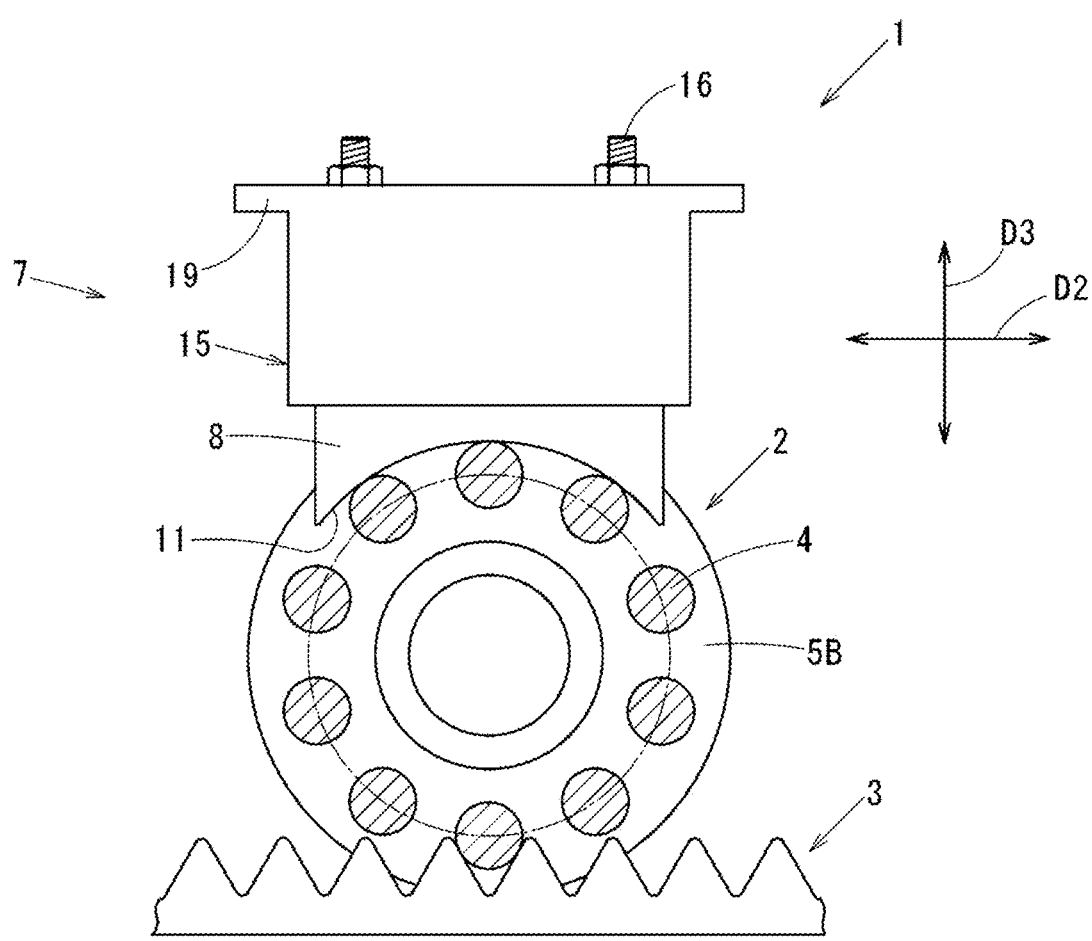
FIG. 1 is a front view of a driving force transmission device showing its internal structure (first embodiment).

A driving force transmission device 1 (hereafter referred to as a transmission device 1) according to a first embodiment will be described with reference to FIGS. 1 to 11. As shown in FIG. 1, the transmission device 1 is, for example, a rack-and-pinion transmission device including a pinion 2 and a rack 3 meshing with each other. The transmission device 1 moves various products by moving, for example, a housing (not shown) accommodating the pinion 2. For example, the transmission device 1 rotates the pinion 2 to move the pinion 2 along the rack 3 with the teeth of the pinion 2 meshing with the teeth of the rack 3. The teeth of the rack 3 have a profile following a predetermined cycloid.

Figure 2:
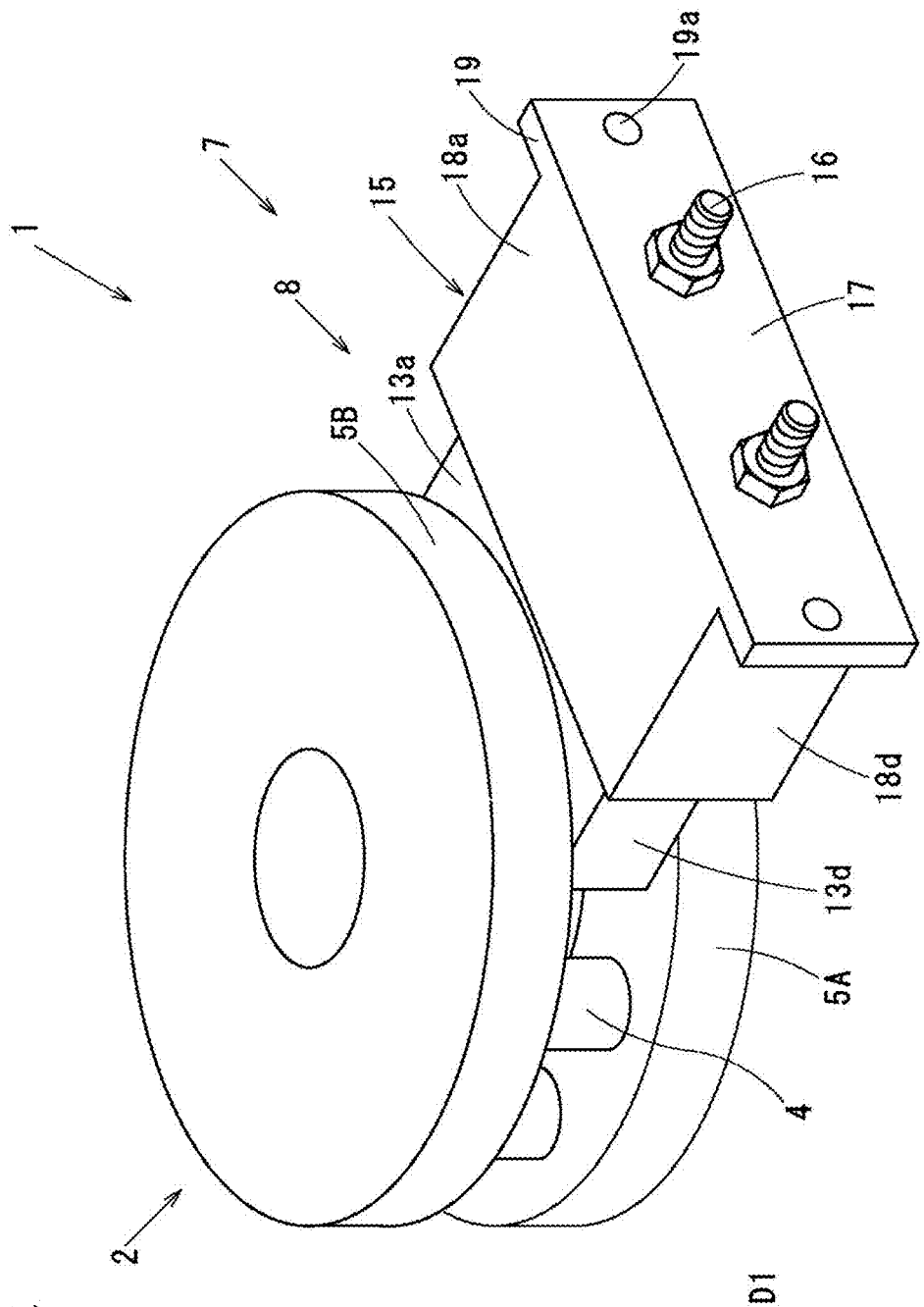
FIG. 2 is a perspective view of the driving force transmission device (first embodiment).
Figure 3:
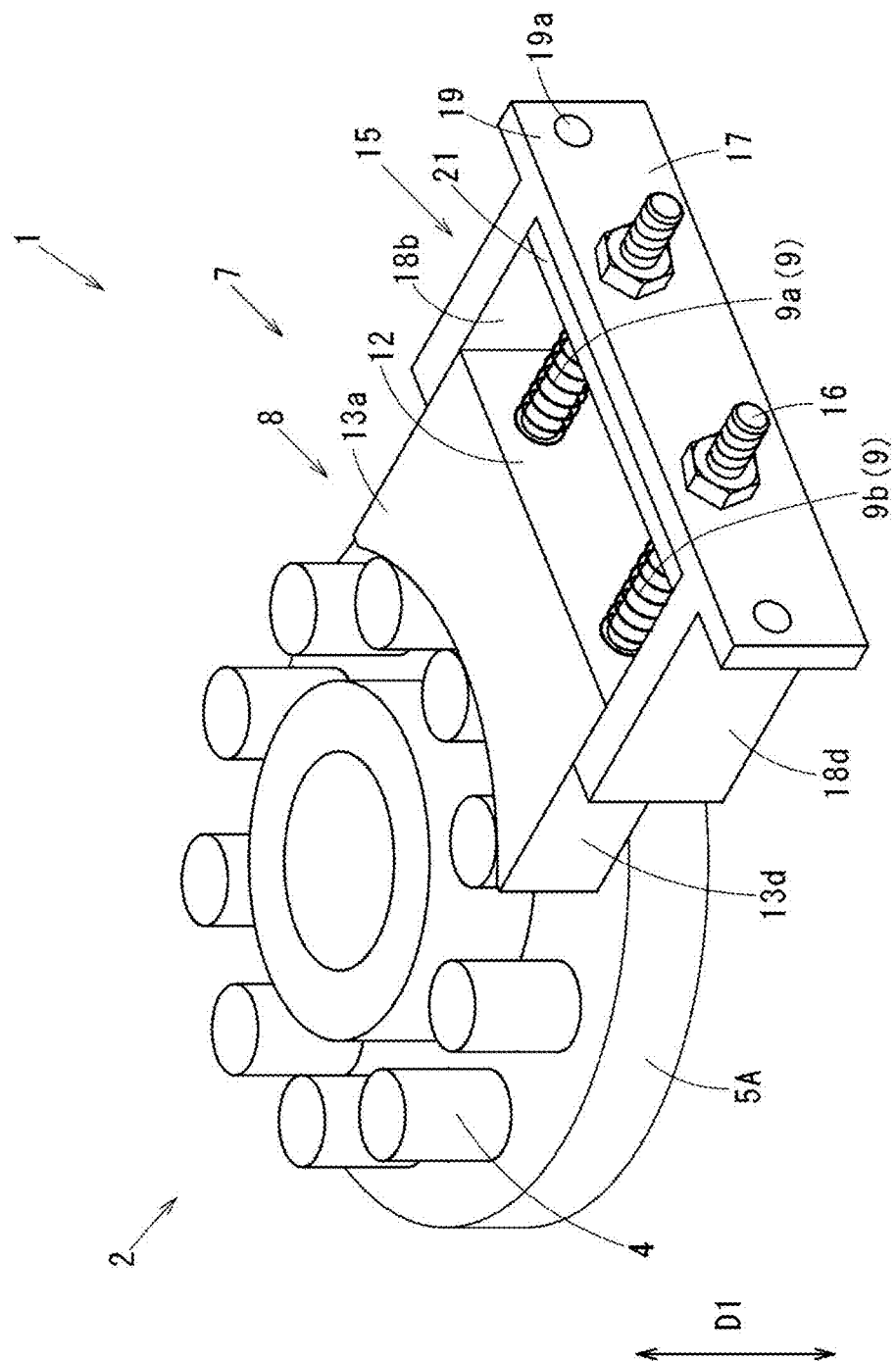
FIG. 3 is a perspective view of the driving force transmission device showing the internal structure (first embodiment).
Figure 4:
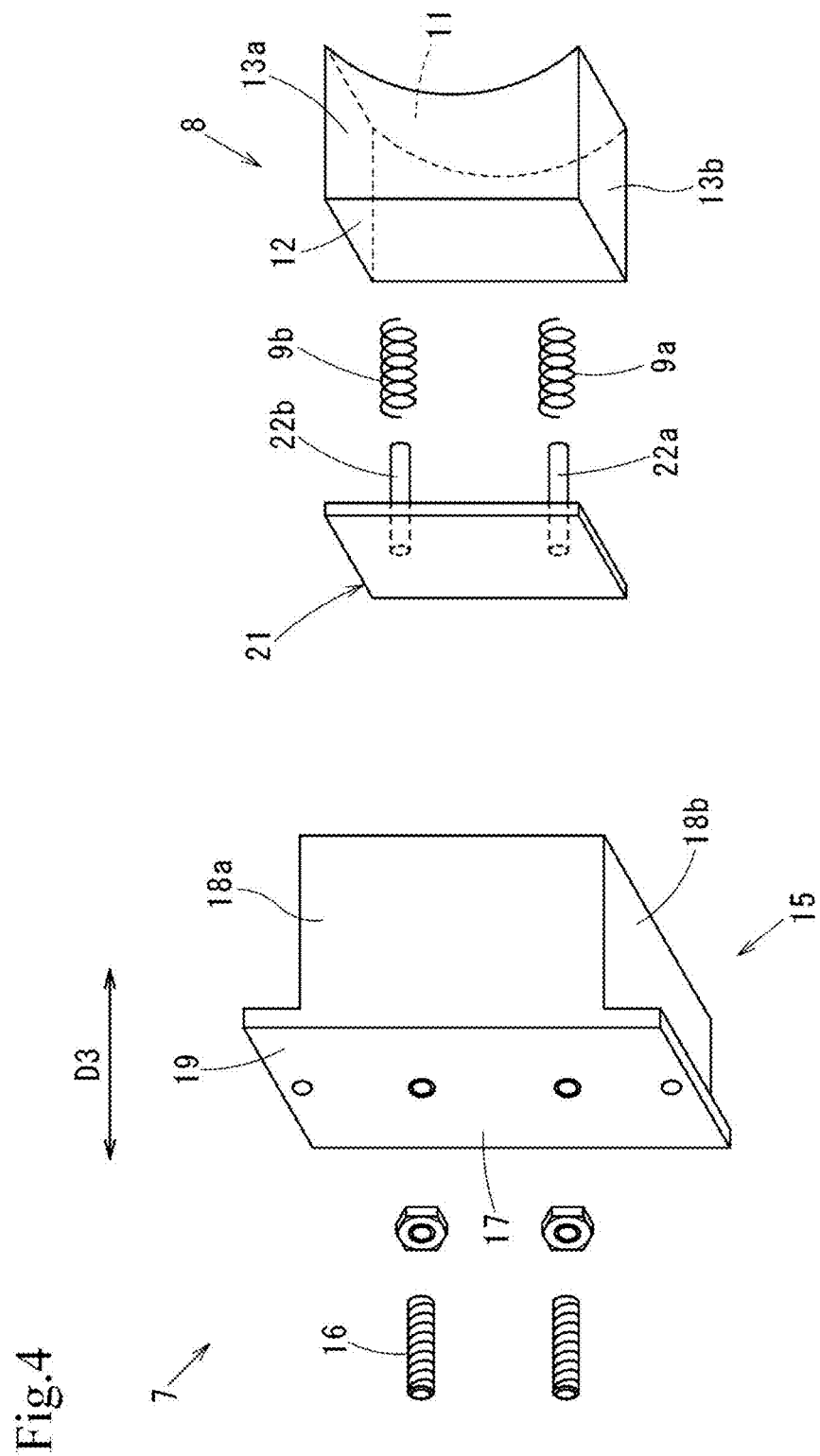
FIG. 4 is an exploded perspective view of an oil feeder (first embodiment).
Figure 5:
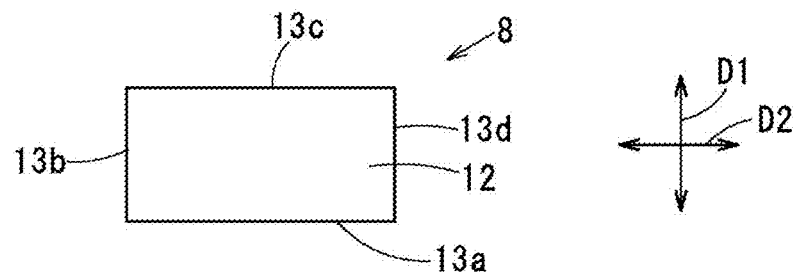
FIG. 5 is a plan view of a feeder body (first embodiment).
Figure 6:
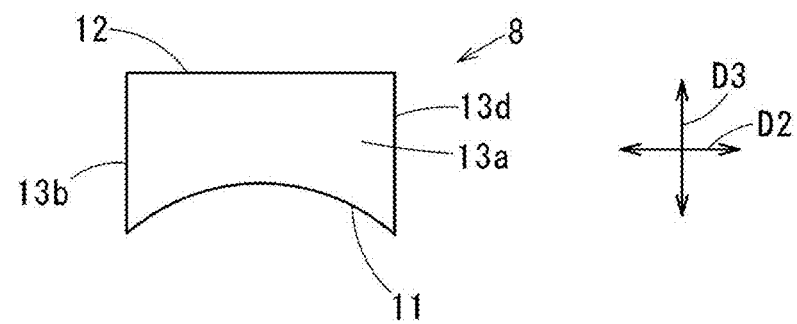
FIG. 6 is a front view of the feeder body (first embodiment).
Figure 7:
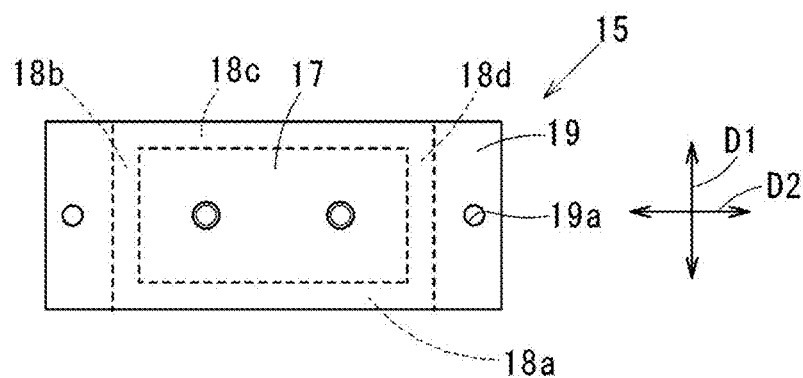
FIG. 7 is a plan view of a case (first embodiment).
Figure 8:
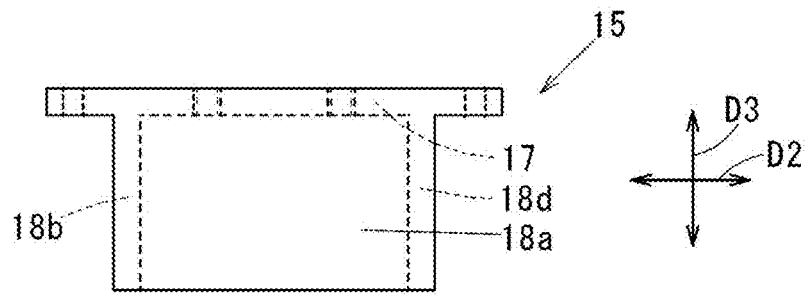
FIG. 8 is a front view of the case (first embodiment).

The structure of the pinion 2 is now described (refer to, for example, FIGS. 1 to 3). The pinion 2 is a pin-roller pinion. More specifically, the pinion 2 includes multiple cylindrical metal pin rollers 4 and two supports 5A and 5B that support the pin rollers 4 at the two ends of the pin rollers 4 in the axial direction to arrange the pin rollers 4 in a cylindrical shape and parallel to the axial direction of rotation of the pinion 2. The support 5A is, for example, a flanged support 5A with a cylinder. The support 5B is, for example, a flanged support 5B without a cylinder. The transmission device 1 moves the pinion 2 along the rack 3 by rotating the pinion 2 with the pin rollers 4 as teeth meshing with the teeth of the rack 3.

Each of the supports 5A and 5B has as many circular holes as the pin rollers 4 at equal angular intervals. The circular holes accommodate bearings (not shown). The supports 5A and 5B have the respective circular holes facing each other. The pin rollers 4 extend across the supports 5A and 5B. Each pin roller 4 has the two ends in the axial direction rotatably supported in the respective circular holes with the respective bearings.

The transmission device 1 includes an oil feeder 7 (described below) for smooth meshing between the pin rollers 4 and the teeth of the rack 3. The oil feeder 7 feeds oil to the pin rollers 4, and includes a feeder body 8 and an urging unit 9 (described below).

The feeder body 8 is a source of oil fed to the pin rollers 4, and is formed from, for example, an oil-impregnated resin. The feeder body 8 includes a cylindrical surface 11 with a radius substantially the same as the radius of the revolution of the outermost peripheries of the pin rollers 4 when the pinion 2 rotates (refer to, for example, FIG. 1). The urging unit 9 urges the feeder body 8 to place the cylindrical surface 11 in contact with the outermost peripheries of the pin rollers 4. The urging unit 9 presses the cylindrical surface 11 against the pin rollers 4 also during rotation of the pinion 2 to feed oil to the pin rollers 4.

More specifically, the oil feeder 7 feeds oil to the pin rollers 4 from the feeder body 8 when the pinion 2 rotates and the outermost peripheries of the pin rollers 4 slide on the cylindrical surface 11. The urging unit 9 includes, for example, two coil springs 9a and 9b as urging members (described later).

The axial direction of rotation of the pinion 2 may be hereafter referred to as a first direction D1. The direction of a specific one of the tangents to a circle being a path of the outermost peripheries of the revolving pin rollers 4 may be referred to as a second direction D2. The direction perpendicular to both the first and second directions D1 and D2 may be referred to as a third direction D3.

In the first embodiment, the second direction D2 aligns with the direction in which the pinion 2 moves.

The urging unit 9 urges the feeder body 8 in the third direction D3 at, for example, two positions (refer to, for example, FIGS. 3, 4, and 9 to 11). More specifically, the two coil springs 9a and 9b included in the urging unit 9 have their seats located on a facing flat surface 12 in the longitudinal direction.

In other words, the feeder body 8 has the flat surface 12, which is rectangular, opposite to the cylindrical surface 11 in the third direction D3. The flat surface 12 is parallel to the first and second directions D1 and D2 and perpendicular to the third direction D3. The longitudinal direction of the flat surface 12 substantially aligns with the second direction D2. The seats for the coil springs 9a and 9b are located on the flat surface 12 in the longitudinal direction. The coil springs 9a and 9b are located to urge the feeder body 8 in the third direction D3 from the flat surface 12. Four side surfaces 13a to 13d (refer to, for example, FIGS. 5 and 6) connecting the flat surface 12 and the cylindrical surface 11 slide on the inner walls of a case 15 (described later).

The oil feeder 7 includes a mover 16 (described below). More specifically, the mover 16 moves the coil springs 9a and 9b in the third direction D3 relative to the feeder body 8. More specifically, the mover 16 includes, for example, setscrews (refer to, for example, FIGS. 9 to 11) screwed on the case 15 described below (hereafter, the mover 16 may also be referred to as setscrews 16). The case 15 covers a portion of the feeder body 8 adjacent to the flat surface 12. The case 15 includes a top wall 17 and four side walls 18a to 18d described below (refer to, for example, FIGS. 7 and 8).

More specifically, the top wall 17 receives the screwed setscrews 16, and faces the flat surface 12. The side walls 18a to 18d slide on the respective side surfaces 13a to 13d when the positions of the coil springs 9a and 9b are changed with the setscrews 16. The top wall 17 includes, at its two ends in the longitudinal direction, screw margins 19 for fastening the case 15 to the housing with screws.

The space defined by the flat surface 12 and the inner surfaces of the top wall 17 and the side walls 18a to 18d accommodates a plate 21 (refer to, for example, FIGS. 9 to 11) against which the ends of the setscrews 16 abut. The plate 21 has substantially the same rectangular shape as the flat surface 12. Two guide rods 22a and 22b protrude from the surface of the plate 21 opposite to the surface against which the setscrews 16 abut (refer to, for example, FIGS. 4 and 9 to 11). The guide rods 22a and 22b extend through the spaces defined by the internal circumferences of the coil springs 9a and 9b and abut against the flat surface 12 to guide the coil springs 9a and 9b.

The coil springs 9a and 9b are thus held between, in the third direction D3, the seats nearer the feeder body 8, or more specifically, the seats on the flat surface 12 and the seats nearer the mover 16, or more specifically, the seats on the plate 21 to generate an elastic force. The seats nearer the feeder body 8 may be hereafter referred to as first seats. The seats nearer the mover 16 may be referred to as second seats. A member including the second seats may be referred to as a seat member (in the first embodiment, the plate 21 is the seat member).

When the setscrews 16 are moved in the third direction D3 relative to the feeder body 8, the plate 21 or the second seats can be moved in the third direction D3. The movement of the second seats in the third direction D3 can change the positions of the coil springs 9a and 9b relative to the feeder body 8 in the third direction D3.

Adjustment Method in First Embodiment

Figure 9:
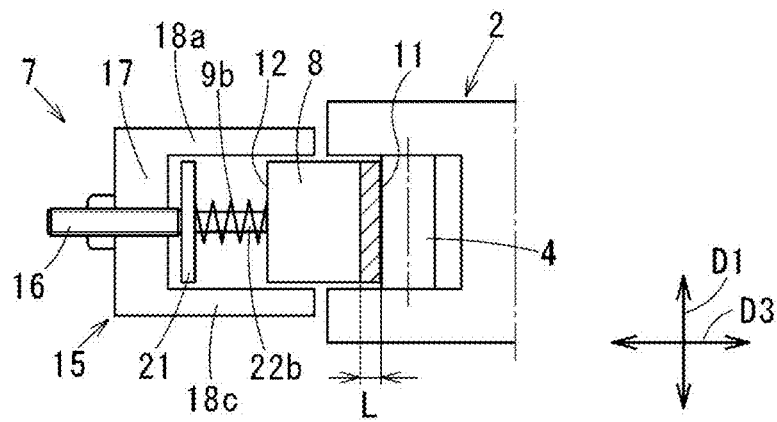
FIG. 9 is a diagram of the oil feeder before wear (first embodiment).
Figure 10:
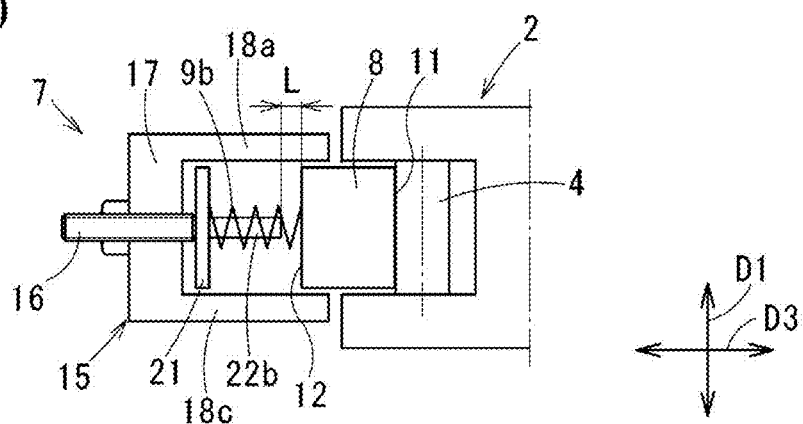
FIG. 10 is a diagram of the oil feeder after wear (first embodiment).

A method for adjusting the oil feed performance of the transmission device 1 according to the first embodiment will be described with reference to, for example, FIGS. 9 to 11. When, for example, the cylindrical surface 11 is worn down by a length L toward the flat surface 12 and the coil springs 9a and 9b expand by the length L in the third direction D3, the cylindrical surface 11 presses the pin rollers 4 with a weaker force. This decreases the oil feed performance for the pin rollers 4 (refer to, for example, FIGS. 9 and 10).

Figure 11:
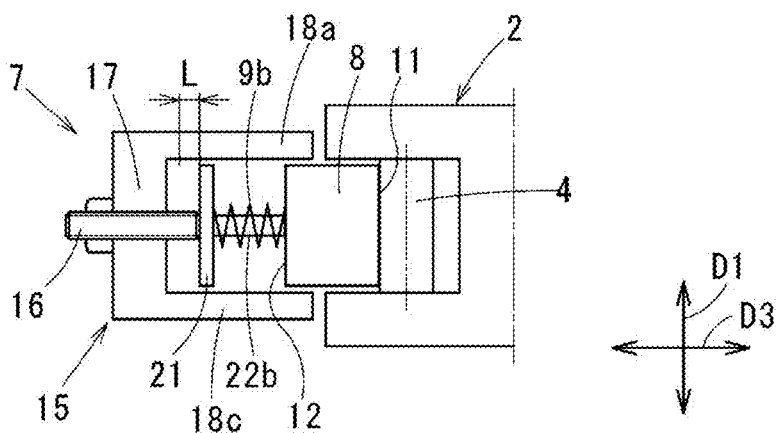
FIG. 11 is a diagram of the oil feeder after adjustment (first embodiment).

Thus, the setscrews 16 are moved forward to move the plate 21 in the third direction D3 by the length L in the case 15 (refer to, for example, FIG. 11). The second seats thus move forward in the third direction D3. This restores the lengths of the coil springs 9a and 9b to the state before use of the transmission device 1, thus restoring the pressing force of the cylindrical surface 11 against the pin rollers 4 and also restoring the oil feed performance for the pin rollers 4.

Effects of First Embodiment

The driving force transmission device 1 according to the first embodiment includes the pin-roller pinion 2 meshing with another gear and the oil feeder 7 that feeds oil to the pinion 2. The oil feeder 7 includes the feeder body 8 and the coil springs 9a and 9b as the urging members as described below. The feeder body 8 includes the cylindrical surface 11 with a radius substantially the same as the radius of the revolution of the outermost peripheries of the pin rollers 4 when the pinion 2 rotates. The coil springs 9a and 9b urge the feeder body 8 to allow the outermost peripheries of the pin rollers 4 to slide on the cylindrical surface 11 as the pinion 2 rotates.

The coil springs 9a and 9b urge the feeder body 8 in the third direction D3 perpendicular to both the first and second directions D1 and D2, where the first direction D1 is the axial direction of rotation of the pinion 2, and the second direction D2 is the direction of a specific one of the tangents to a circle being a path of the outermost peripheries of the revolving pin rollers 4.

In the transmission device 1, the coil springs 9a and 9b having the same urging direction press the cylindrical surface 11 against the pin rollers 4 in the same direction. In other words, the coil springs 9a and 9b have the pressing forces acting in the same direction.

This reduces a change in the modulus of elasticity of the feeder body 8 in the pressing direction when the cylindrical surface 11 is worn down toward the flat surface 12. This thus reduces, when the feeder body 8 is worn, a change in the elastic force resulting from a change in the modulus of elasticity, reducing a change in the pressing force resulting from wear of the cylindrical surface 11. This structure can avoid decreasing the oil feed performance for the pin rollers 4 resulting from wear of the feeder body 8.

Figure 20:
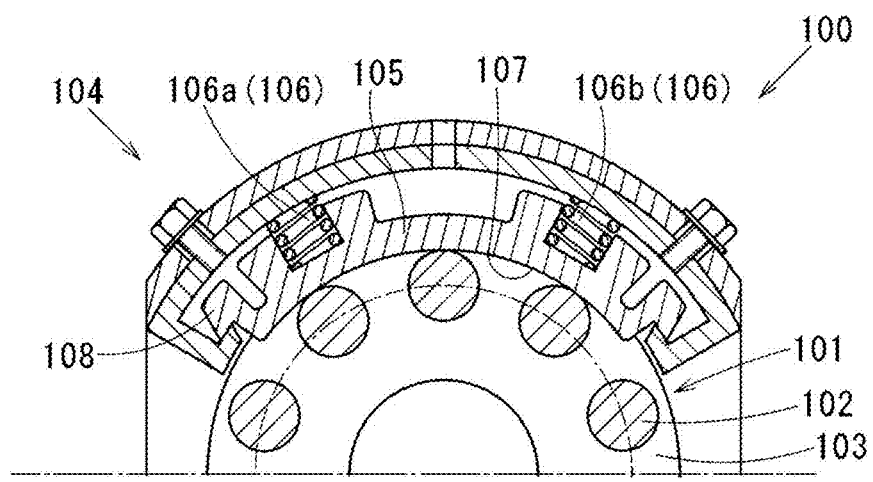
FIG. 20 is a front view of a driving force transmission device showing its internal structure before wear (known example).
Figure 21:
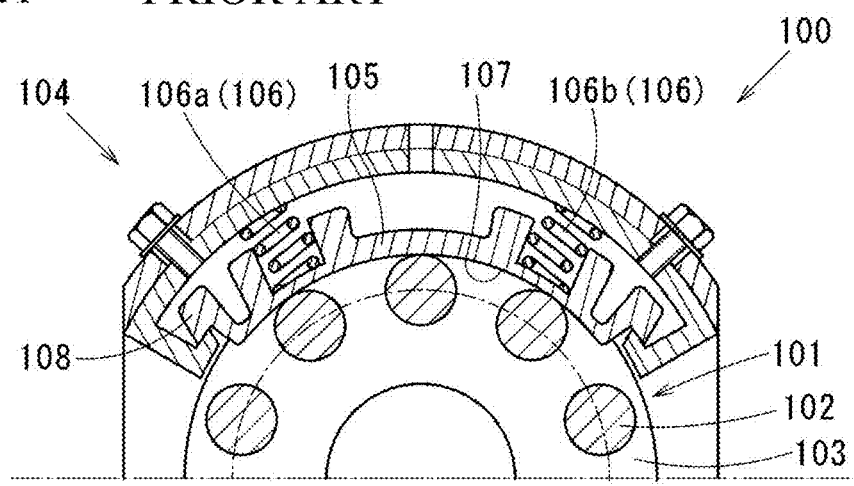
FIG. 21 is a front view of the driving force transmission device showing the internal structure after wear (known example).

Any decrease in oil feed performance resulting from wear can be restored. More specifically, the oil feeder 104 in the known driving force transmission device 100 has the pressing force acting in different directions at different locations of the coil springs 106a and 106b (refer to FIG. 20). Thus, when the cylindrical surface 107 of the feeder body 105 is worn down, the seats for the coil springs 106a and 106b on the feeder body 105 may be displaced, or the coil springs 106a and 106b may be inclined (refer to FIG. 21). The pressing forces of the coil springs 106a and 106b are less likely to be restored. Thus, the known oil feeder 104 has difficulty in restoring the oil feed performance decreased by wear.

In contrast, the transmission device 1 includes the coil springs 9a and 9b having the urging force acting in the same direction. When the cylindrical surface 11 is worn down, the coil springs 9a and 9b are moved in the urging direction (or specifically, in the third direction D3) to adjust the pressing force. Thus, oil feed performance decreased by wear can be restored.

In the transmission device 1 according to the first embodiment, the oil feeder 7 includes the mover 16 described below. The setscrews 16 serving as the mover 16 change the positions of the coil springs 9a and 9b relative to the feeder body 8 in the third direction D3. The setscrews 16 as the mover are thus moved to restore oil feed performance decreased by wear.

Structure in Second Embodiment

Figure 12:
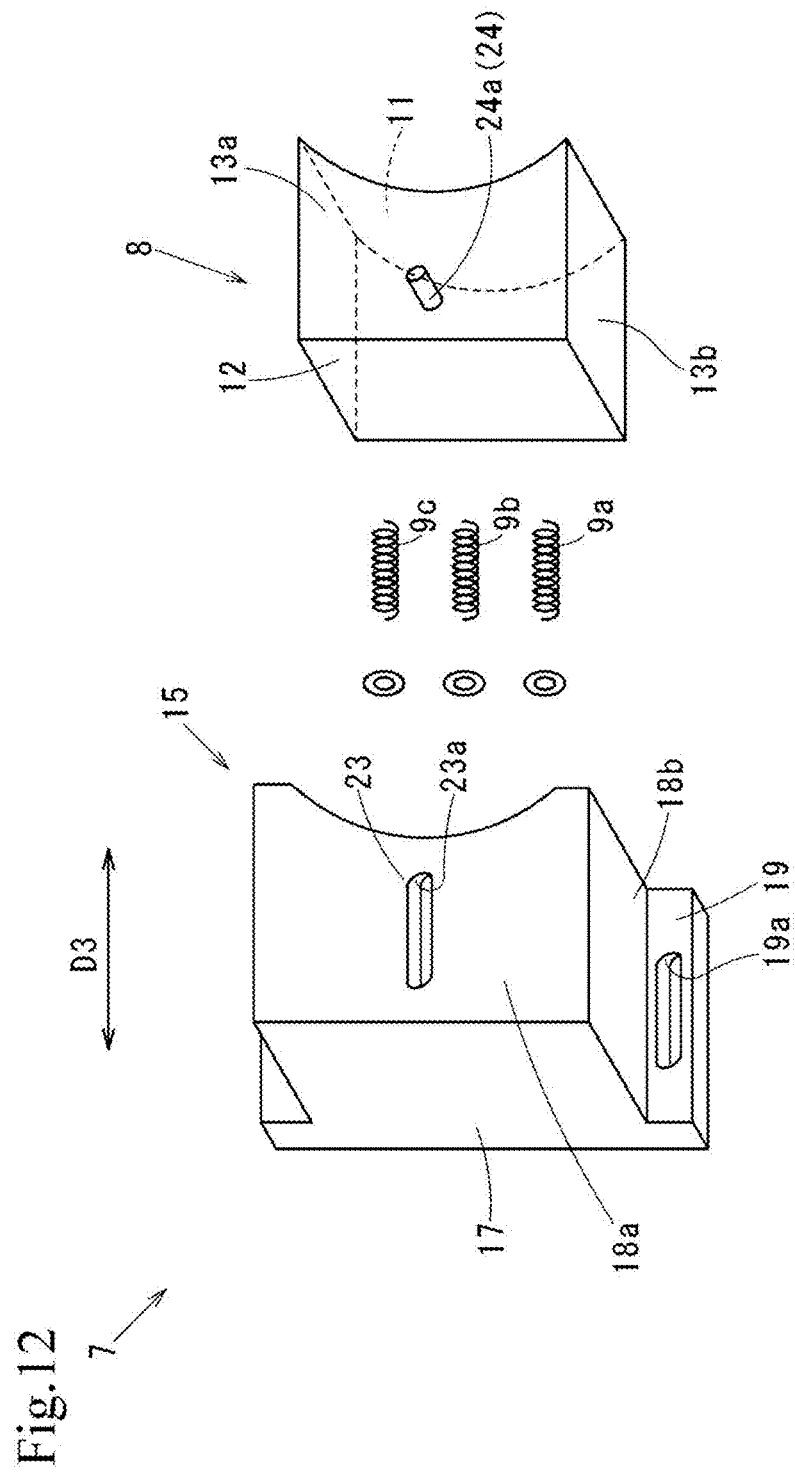
FIG. 12 is an exploded perspective view of an oil feeder (second embodiment).

In a transmission device 1 according to a second embodiment, the urging unit 9 includes three coil springs 9a, 9b, and 9c (refer to, for example, FIG. 12), with the seats for the coil springs 9a, 9b, and 9c arranged on the flat surface 12 at equal intervals in the longitudinal direction. The coil springs 9a to 9c have the respective guide rods 22a, 22b, and 22c, with no plate 21 contained in the case 15. The guide rods 22a, 22b, and 22c extend in the third direction D3 from the inner surface of the top wall 17 through the spaces defined by the internal circumferences of the coil springs 9a, 9b, and 9c to guide the coil springs 9a, 9b, and 9c (refer to, for example, FIGS. 13 to 15). The second seats are located on the case 15. In other words, the case 15 is the seat member in the second embodiment.

The case 15 in the second embodiment includes the screw margins 19 at both ends of a side wall 18c. Each screw margin 19 has a screw hole 19a elongated in the third direction D3 (refer to, for example, FIG. 12). The case 15 can thus be moved in the third direction D3 when the screws at the screw margins 19 are loosened. When the case 15 is moved in the third direction D3, the coil springs 9a, 9b, and 9c can be moved in the third direction D3 relative to the feeder body 8.

The transmission device 1 according to the second embodiment includes an engagement structure between a first reference portion 23 and a second reference portion 24 as described below (refer to, for example, FIGS. 12 to 17). More specifically, the case 15 includes the first reference portion 23 remaining at the same position relative to the second seats. The first reference portion 23 is engaged with the second reference portion 24 remaining at the same position relative to the first seats at an observable position.

More specifically, the first reference portion 23 is a portion of a side wall 18a of the case 15 adjacent to an elongated hole 23a in the side wall 18a. The elongated hole 23a is elongated in the third direction D3 at the center of the side wall 18a. The second reference portion 24 is a protrusion 24a extending perpendicular to the side surface 13a of the feeder body 8.

The protrusion 24a extends through the elongated hole 23a and is movable in the third direction D3. Before use, or more specifically, without the cylindrical surface 11 of the feeder body 8 ground by, for example, wear, the protrusion 24a is engaged with the portion the inner wall of the elongated hole 23a nearer the top wall 17. As the cylindrical surface 11 is ground down by, for example, wear toward the flat surface 12, the protrusion 24a separates from the wall nearer the top wall 17 toward the opening of the case 15.

Adjustment Method in Second Embodiment

Figure 13:
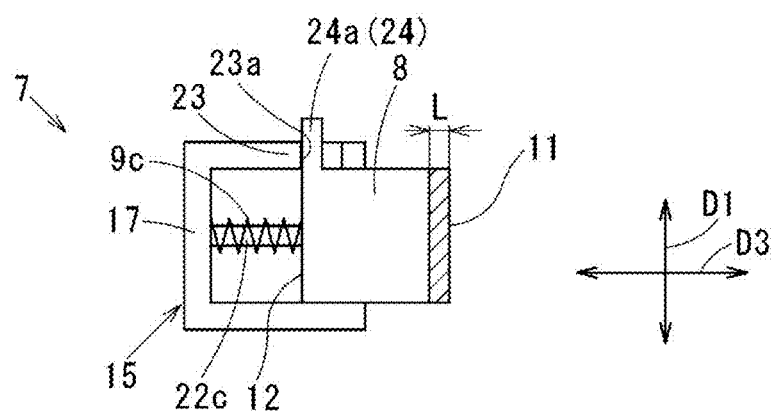
FIG. 13 is a diagram of the oil feeder at a position before wear (second embodiment).
Figure 14:
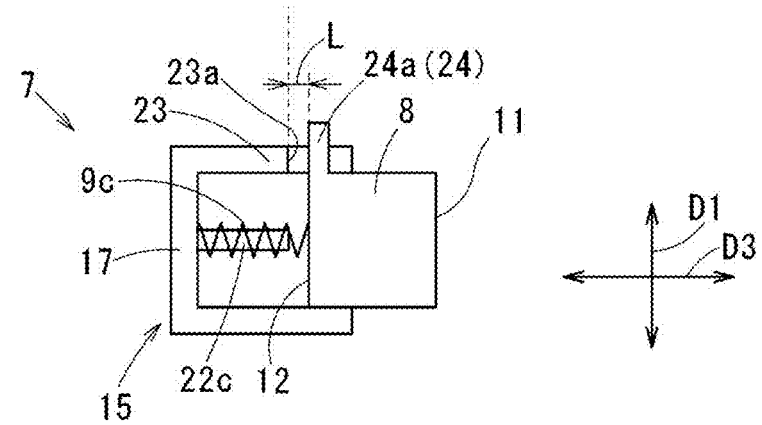
FIG. 14 is a diagram of the oil feeder at a position after wear (second embodiment).
Figure 15:
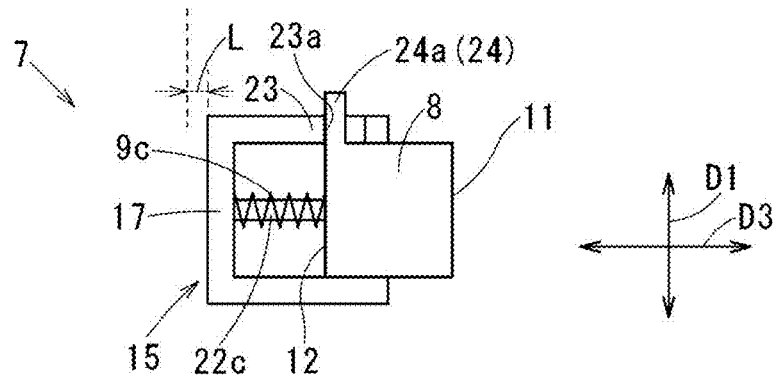
FIG. 15 is a diagram of the oil feeder at a position after adjustment (second embodiment).
Figure 16:
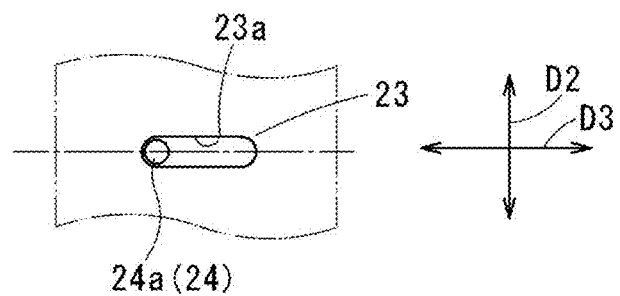
FIG. 16 is a diagram describing engagement between a first reference portion and a second reference portion before wear (second embodiment).
Figure 17:
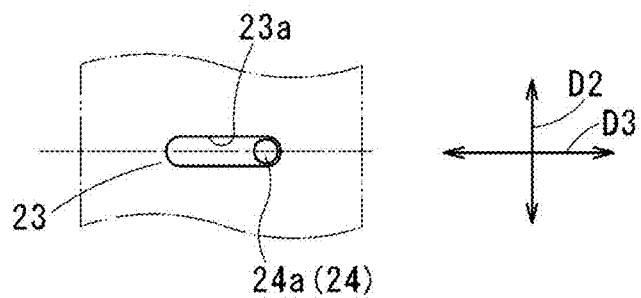
FIG. 17 is a diagram describing engagement between the first reference portion and the second reference portion after wear (second embodiment).

A method for adjusting the oil feed performance of the transmission device 1 according to the second embodiment will be described with reference to FIGS. 13 to 15. When, for example, the cylindrical surface 11 is worn down by the length L toward the flat surface 12 and the coil springs 9a, 9b, and 9c expand in the third direction D3 by the length L, the cylindrical surface 11 presses the pin rollers 4 with a weaker force. This decreases the oil feed performance for the pin rollers 4 (refer to, for example, FIGS. 13 and 14).

In this state, the protrusion 24a is separate from the portion of the wall nearer the top wall 17. The screws at the screw margins 19 are loosened to move the case 15 forward in the third direction D3 by the length L. This moves the elongated hole 23a forward in the third direction D3 by the length L and engages the portion of the inner wall of the elongated hole 23a nearer the top wall 17 with the protrusion 24a (refer to, for example, FIG. 15). This restores the lengths of the coil springs 9a, 9b, and 9c to the state before use of the transmission device 1, restoring the pressing force of the cylindrical surface 11 against the pin rollers 4 and also restoring the oil feed performance for the pin rollers 4.

Effects of Second Embodiment

In the transmission device 1 according to the second embodiment, the second seats are located on the case 15. Thus, the oil feed performance can be adjusted by moving the case 15 in the third direction D3 to move the coil springs 9a, 9b, and 9c in the third direction D3 relative to the feeder body 8. The screw hole 19a in each screw margin 19 is elongated in the third direction D3. Thus, the oil feed performance can be adjusted by loosening the screws at the screw margins 19 to move the case 15 in the third direction D3.

In the transmission device 1 according to the second embodiment, the portion of the inner wall of the elongated hole 23a in the case 15 nearer the top wall 17 is engaged with the protrusion 24a on the feeder body 8 at an observable position. When the cylindrical surface 11 of the feeder body 8 is ground down by, for example, wear, the protrusion 24a separates from the portion of the wall nearer the top wall 17. This allows the determination as to whether the oil feed performance is adjusted through visual inspection of the distance between the protrusion 24a and the portion of the wall nearer the top wall 17.

With the method for adjusting the transmission device 1 according to the second embodiment, when the cylindrical surface 11 is worn down and the protrusion 24a separates from the portion of the wall nearer the top wall 17, the screws at the screw margins 19 are loosened to move the case 15 in the third direction D3 to engage the portion of the wall nearer the top wall 17 with the protrusion 24a. This allows restoring of the oil feed performance with visual observation.

Third Embodiment

Figure 18:
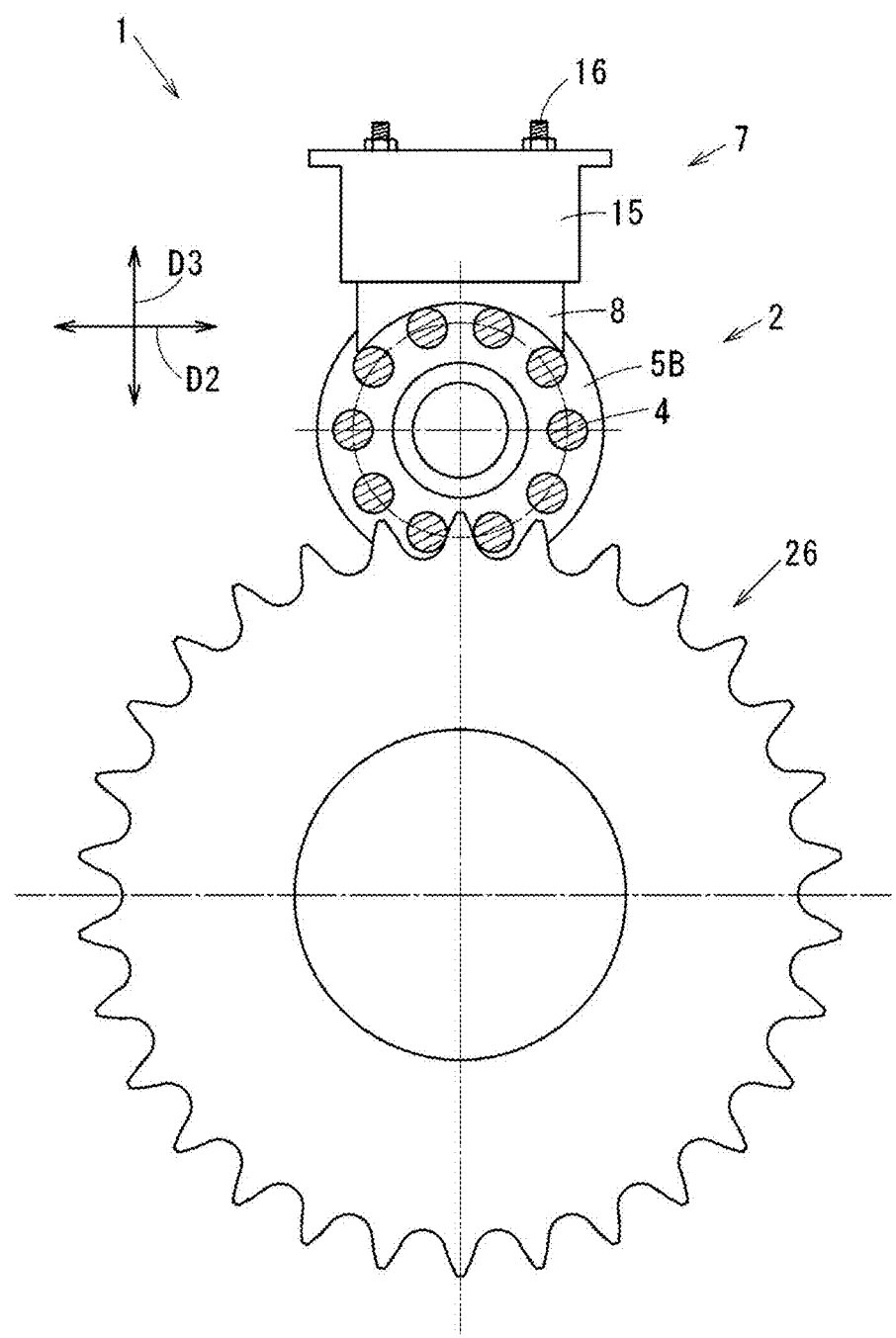
FIG. 18 is a front view of a driving force transmission device showing its internal structure (third embodiment).

Unlike the transmission device 1 according to the first embodiment, a transmission device 1 according to a third embodiment includes the pinion 2 meshing with a spur gear 26 as shown in FIG. 18. The oil feeder 7 has the same structure as in the first embodiment. The second direction D2 is perpendicular to a straight line perpendicular to, for example, both the rotation axes of the pinion 2 and the spur gear 26. The transmission device 1 with this structure can also produce the same effects as the transmission device 1 according to the first embodiment.

Structure in Fourth Embodiment

Figure 19:
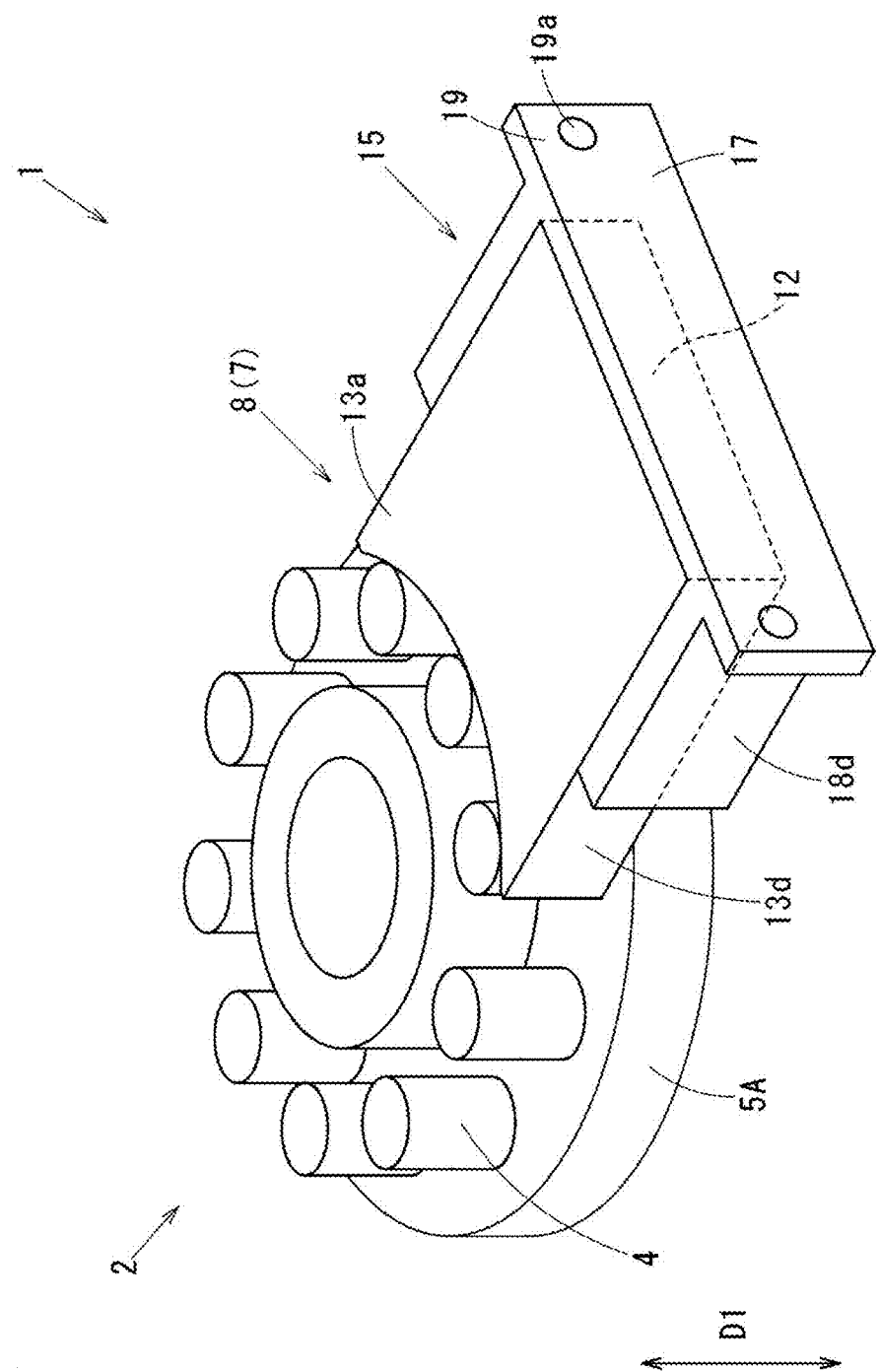
FIG. 19 is a perspective view of a driving force transmission device showing its internal structure (fourth embodiment).

Unlike the transmission devices 1 according to the first to third embodiments, a transmission device 1 according to a fourth embodiment includes an oil feeder 7 not including the urging unit 9 as shown in FIG. 19. The feeder body 8 uses its elasticity to place the cylindrical surface 11 in contact with the outermost peripheries of the pin rollers 4 to press the cylindrical surface 11 against the pin rollers 4. More specifically, the feeder body 8 is formed from, for example, plastic foam impregnated with oil. A portion of the feeder body 8 nearer the flat surface 12 is accommodated in the case 15. With the elasticity of the feeder body 8, the cylindrical surface 11 comes in contact with the outermost peripheries of the pin rollers 4 with pressure, and the flat surface 12 comes in contact with the top wall 17 with pressure. This structure can reduce a change in the pressing force of the cylindrical surface 11 against the pin rollers 4, thus avoiding decreasing the oil feed performance for the pin rollers 4.

Modifications

The present invention may be modified variously without departing from the spirit and scope of the invention. For example, the transmission device 1 according to the first or second embodiment moves the pinion 2 along the rack 3 by rotating the pinion 2. In a modification, the pinion 2 remaining at the same position may be rotated to move the rack 3. The transmission device 1 may have the pinion 2 meshing with a gear other than the rack 3 or the spur gear 26.

In the transmission device 1 according to any of the first to third embodiments, the urging unit 9 includes coil springs as urging members. Rather than being the coil springs, the urging members may be leaf springs or elastic bodies such as rubber bodies. The urging unit 9 may not include the urging members described above. For example, the space defined between the flat surface 12 of the feeder body 8 and the top wall 17 of the case 15 may be maintained airtight, and pressure air having a specific pressure may be supplied into this space to urge the feeder body 8. In the transmission device 1 according to any of the first to third embodiments, the feeder body 8 is formed from an oil-impregnated resin. In a modification, the feeder body 8 may be formed from, for example, a solid fat or a metal impregnated with oil.

In the transmission device 1 according to any of the first to third embodiments, the mover moves the urging members such as the coil spring 9a when the cylindrical surface 11 is ground down by, for example, wear. In a modification, the mover may be used other than when the cylindrical surface 11 is worn down. For example, the mover may be used to move the urging members to adjust the preset force of the urging members during the manufacture of the transmission device 1. In the transmission device 1 according to any of the first to third embodiments, the second direction D2 aligns with the direction in which the pinion 2 moves, but the second direction D2 is not limited to the direction in the first or second embodiment. The second direction D2 may be inclined with respect to the direction in which the pinion 2 moves.

REFERENCE SIGNS LIST

1 transmission device (driving force transmission device)
2 pinion
3 rack (another gear)
4 pin roller
7 oil feeder
11 cylindrical surface
8 feeder body
9 urging unit
D1 first direction
D2 second direction
D3 third direction

The invention claimed is:

1. A driving force transmission device, comprising:
a pinion configured to mesh with a gear; and
an oil feeder configured to feed oil to the pinion,
wherein the pinion includes a plurality of pin rollers arranged in a cylindrical shape and parallel to an axial direction of rotation of the pinion, and each of the plurality of pin rollers is cylindrical and meshes with the gear as a tooth,
the oil feeder includes
a feeder body being a source of oil for feeding the oil to the plurality of pin rollers, and including a cylindrical surface with a radius substantially the same as a radius of revolution of outermost peripheries of the plurality of the pin rollers so that the cylindrical surface contacts the pin rollers when the pinion rotates;
an urging unit for urging the feeder body to place the cylindrical surface in contact with the outermost peripheries of the plurality of the pin rollers; and
an adjustment mechanism to adjust a position of the cylindrical surface with respect to the pin rollers,
the oil feeder for feeding the oil to the plurality of pin rollers from the feeder body when the pinion rotates and the outermost peripheries of the plurality of the pin rollers slide on the cylindrical surface, and
the urging unit for urging the feeder body in a third direction perpendicular to a first direction and to a second direction at two or more positions, where the first direction is the axial direction of rotation of the pinion, and the second direction is a direction of a specific tangent of tangents to a circle being a path of the outermost peripheries of one of the pin rollers that is located at a top position.

2. The driving force transmission device according to claim 1, wherein
the urging unit includes an urging member for urging the feeder body in the third direction with an elastic force generated by deflection of the urging member, and
the oil feeder includes a mover configured to move the urging member in the third direction relative to the feeder body.

3. The driving force transmission device according to claim 1, wherein
the urging unit includes an urging member configured to urge the feeder body in the third direction with an elastic force generated by deflection of the urging member,
the oil feeder includes a seat member including a second seat holding the urging member between the second seat and a first seat in the third direction to cause the urging unit to generate an elastic force, and the first seat is located on the feeder body,
the seat member for moving in the third direction to move the urging member in the third direction relative to the feeder body,
the seat member further includes a first reference portion remaining at a same position relative to the second seat,
the first reference portion is engaged with, at an observable position, a second reference portion remaining at a same position relative to the first seat, and
the second reference portion for separating from the first reference portion when the cylindrical surface of the feeder body is ground down.

4. A method for adjusting the driving force transmission device according to claim 3, the method comprising:
moving the seat member in the third direction to engage the first reference portion with the second reference portion when the cylindrical surface is ground down and the second reference portion separates from the first reference portion.

5. The driving force transmission device according to claim 1, the feeder body further includes a case where the cylindrical surface moves within in the third direction, the case has an elongated screw hole along the third direction so that the position of the cylindrical surface adjusts with respect to the pin rollers.

6. A driving force transmission device, comprising:
a pinion configured to mesh with a gear; and
a feeder body configured to feed oil to the pinion,
wherein the pinion includes a plurality of pin rollers arranged in a cylindrical shape and parallel to an axial direction of rotation of the pinion, and each of the plurality of pin rollers is cylindrical and meshes with the gear as a tooth,
wherein the feeder body is a source of oil for feeding the oil to the plurality of pin rollers, and includes a cylindrical surface with a radius substantially the same as a radius of revolution of outermost peripheries of the plurality of the pin rollers so that the cylindrical surface contacts the pin rollers when the pinion rotates, and
an adjustment mechanism to adjust a position of the cylindrical surface with respect to the pin rollers,
the feeder body for pushing the cylindrical surface with elasticity of the feeder body in a third direction perpendicular to a first direction and to a second direction to place the cylindrical surface in contact with the outermost peripheries of the plurality of the pin rollers, wherein the first direction is the axial direction of rotation of the pinion, and the second direction is a direction of a specific tangent of tangents to a circle being a path of the outermost peripheries of one of the pin rollers that is located at a top position.

* * * * *